(12) United States Patent
Lefkowitz et al.

(10) Patent No.: US 6,508,407 B1
(45) Date of Patent: Jan. 21, 2003

(54) APPARATUS FOR REMOTE TEMPERATURE CONTROL

(75) Inventors: Kenneth R. Lefkowitz, Pipersville, PA (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/596,258

(22) Filed: Jun. 16, 2000

(51) Int. Cl.[7] .............................................. G05D 23/00
(52) U.S. Cl. ...................................................... 236/51
(58) Field of Search ...................... 236/47, 51; 165/208, 165/268, 231, 209

(56) References Cited

U.S. PATENT DOCUMENTS

| | | | | |
|---|---|---|---|---|
| 4,385,724 A | * | 5/1983 | Ramsauer et al. | 236/25 A |
| 4,441,545 A | * | 4/1984 | Alley et al. | 165/209 |
| 5,245,835 A | * | 9/1993 | Cohen et al. | 62/159 |
| 5,303,767 A | * | 4/1994 | Riley | 165/208 |
| 5,318,104 A | * | 6/1994 | Shah et al. | 165/208 |
| 5,839,654 A | * | 11/1998 | Weder | 236/47 |
| 5,860,473 A | * | 1/1999 | Seiden | 165/208 |
| 6,058,247 A | * | 5/2000 | Lahey et al. | 392/399 |

* cited by examiner

Primary Examiner—Teresa Walberg
Assistant Examiner—Daniel Robinson

(57) ABSTRACT

The invention is a remote temperature control system. The remote temperature control system contains temperature sensors, which are remotely placed in zones of temperature regulation throughout an area to be heated or cooled. A thermostat is then placed outside the zones of temperature regulation and communicates with the temperature sensors. Based on the information received from the temperature sensors, the thermostat then sends commands to a temperature control source to regulate the temperature of the various zones of temperature regulation. Placing the temperature sensors in remote locations and having the thermostat outside these remote locations allows the remote temperature remote control system to more accurately control the temperatures in those remote locations.

6 Claims, 3 Drawing Sheets

APPARATUS FOR REMOTE TEMPERATURE CONTROL

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of temperature control systems and more particularly to a remote temperature control system.

2. Description of the Related Art

The central function of a temperature control system is to read current temperature conditions and turn a heating/cooling system on or off to maintain a set temperature condition. Currently, temperature control systems have temperature sensors that are contained within the thermostat. FIG. 1 illustrates a typical temperature control system used to regulate the temperatures in two zones of temperature regulation. As shown in the figure, thermostat 1 includes therein a temperature sensor 2. As is apparent from the drawing, the temperature sensor 2 is positioned proximately to the thermostat 1 and not to the target zones of temperature regulation 4, 5. A temperature control 3 permits a user to set a desired temperature for the target zones of temperature regulation 4, 5. In consequence, the thermostat 1 can adjust the output of the temperature control source 6 responsive to the temperature sensed by the temperature sensor 2 in order to control the temperature in the target zones of temperature regulation 4, 5.

However, placing the temperature sensors 2 inside of the thermostat 1 produces various problems. FIG. 2 illustrates one problematic scenario. Specifically, FIG. 2 illustrates the typical temperature control system of FIG. 1 used to regulate the temperature in two zones of temperature regulation with an additional temperature altering source 7 in one of the zones of temperature regulation 4. In this case, the temperature in the target zone of temperature regulation 4 can differ from the temperature sensed proximate to the temperature sensor 2. As a result, the thermostat 1 cannot appropriately adjust the output of the temperature control source 6 in order to accurately maintain the desired temperature set in the temperature control 3. Rather, the thermostat 1 can adjust the output of the temperature control source 6 in accordance with the temperature conditions sensed by the temperature sensor 2, which in of itself, is positioned remotely from the target zone of temperature regulation 4.

Notably, the heating or cooling of an entire area, such as a house, office complex, or other habitable area can be effected by the placement of the thermostat and internal temperature sensor. Depending on the location of the thermostat and internal temperature sensor, different parts of the area to be heated or cooled can vary widely in temperature. This is because of the dynamics of airflow. Specifically, cool air flows downward and hot air rises. Therefore, if the thermostat and internal temperature sensor are placed in a low area, such as the first floor of a house, the temperature of any upper areas, such as second and third floors, will be at a higher temperature and will not be detected by the thermostat. The opposite is also true if the thermostat and internal temperature sensor are placed in an upper area.

There are additional factors which can alter the effectiveness of temperature regulation such as the position of air ducts in relation to the location of the thermostat, the time of day, time of year, north or south facing rooms, number of windows, tinted glass, etc. For example, if the thermostat and internal temperature sensor are placed in a room that has a small number of windows which do not allow direct sunlight, this room will be at a lower temperature than another room which has numerous windows which receive direct sunlight throughout the day. However, because of the placement, the thermostat and internal temperature sensor cannot detect the higher temperature in the remote room and therefore will not attempt to adjust the temperature.

SUMMARY OF THE INVENTION

The invention is a remote temperature control system that uses remote temperature sensors to provide current temperature readings from one or more zones of temperature regulation to a centrally placed thermostat that turns a heating/cooling system on or off to regulate the temperature in the zones of temperature regulation. This invention allows the thermostat to control the heating/cooling system based on more accurate temperature readings from remote locations rather than adjusting the temperature in remote locations based on a temperature reading from the central location of the thermostat.

The present invention avoids the problems that are inherent in current temperature control systems. Separating the temperature sensors from the thermostat allows the sensors to be placed in remote locations throughout the area to be heated or cooled. The thermostat can then be placed in any centralized location without concern as to its positioning relative to heat ducts, windows, or other concerns. The temperature sensors can then transmit the temperature conditions in various remote locations to the thermostat and the thermostat can turn the heating/cooling system on or off based on these remote temperature readings rather than a temperature reading from a centralized location. Therefore, this invention can more accurately control the temperature of an entire area based on more accurate remote temperature readings and those places that have poorly positioned thermostats can get more effective heating and cooling without rewiring walls to move the thermostat. Hence, an object of this invention is to provide a remote temperature control system that more accurately controls the temperature conditions in remote locations.

In one embodiment of the invention, temperature sensors are placed in remote zones of temperature regulation throughout an area to be heated or cooled. These temperature sensors are communicatively connected to a thermostat. The thermostat is then communicatively connected to a temperature control source.

In a further embodiment of the invention, the temperature conditions in remote zones of temperature regulation are regulated by positioning various temperature sensors in the zones of temperature regulation. A thermostat is then placed within communication range of the sensors. The temperature sensors transmit the temperature conditions in the zone of temperature regulation to the thermostat. In response to the temperature conditions received from the temperature sensors, the thermostat then transmits a temperature regulation command to a temperature control source. The temperature control source then regulates the temperature condition in the zone of temperature regulation based on the temperature regulation command it receives from the thermostat.

A remote temperature control system in accordance with the inventive arrangements can include a thermostat; a temperature sensor placed in a remote zone of temperature regulation and communicatively connected to the thermostat; and a temperature control source communicatively connected to the thermostat. In the preferred embodiment, the temperature sensor is communicatively connected to the thermostat via a wireless transmitter and a wireless receiver.

A method of regulating temperature conditions in a remote zone of temperature regulation in accordance with the inventive arrangements can include the steps of both positioning a temperature sensor in a zone of temperature regulation and positioning a thermostat outside the zone of temperature regulation. Notably, the temperature sensor can transmit a temperature condition in the zone of temperature regulation to the thermostat. Likewise, the thermostat can transmit a temperature regulation command to a temperature control source responsive to the temperature condition received from the temperature sensor. In consequence, the temperature control source can regulate the temperature condition in the zone of temperature regulation responsive to the temperature regulation command received from the thermostat.

In a preferred embodiment, the temperature sensor can transmit the temperature condition in the zone of temperature regulation to the thermostat via a wireless transmitter; and the thermostat can receive the temperature condition in the zone of temperature regulation from the temperature sensor via a wireless receiver. In yet another embodiment, the thermostat can average the temperature conditions received from a plurality of temperature sensors; and the thermostat can transmit a temperature regulation command to the temperature control source based on the average temperature condition. Finally, in yet another embodiment, the thermostat can receive the temperature conditions in a plurality of zones of temperature regulation from a corresponding plurality of temperature sensors and can transmit an individual temperature regulation command to the temperature control source for each of the temperature conditions. In consequence, the temperature control source can regulate the temperature condition of each zone of temperature regulation responsive to the individual temperature regulation command received from the thermostat.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
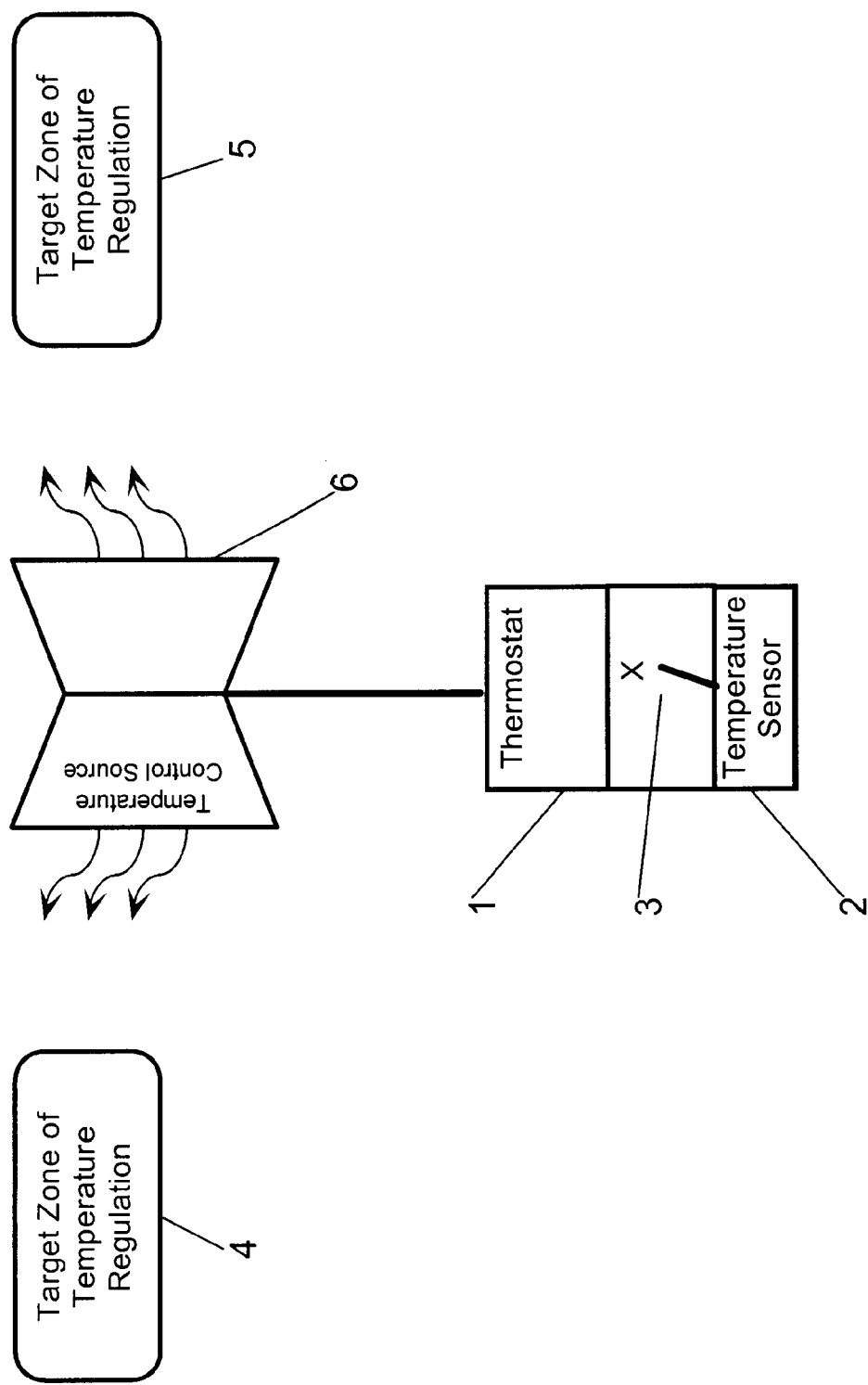
FIG. 1 is an illustration of a typical temperature control system used to regulate the temperatures in two zones of temperature regulation.
Figure 2:
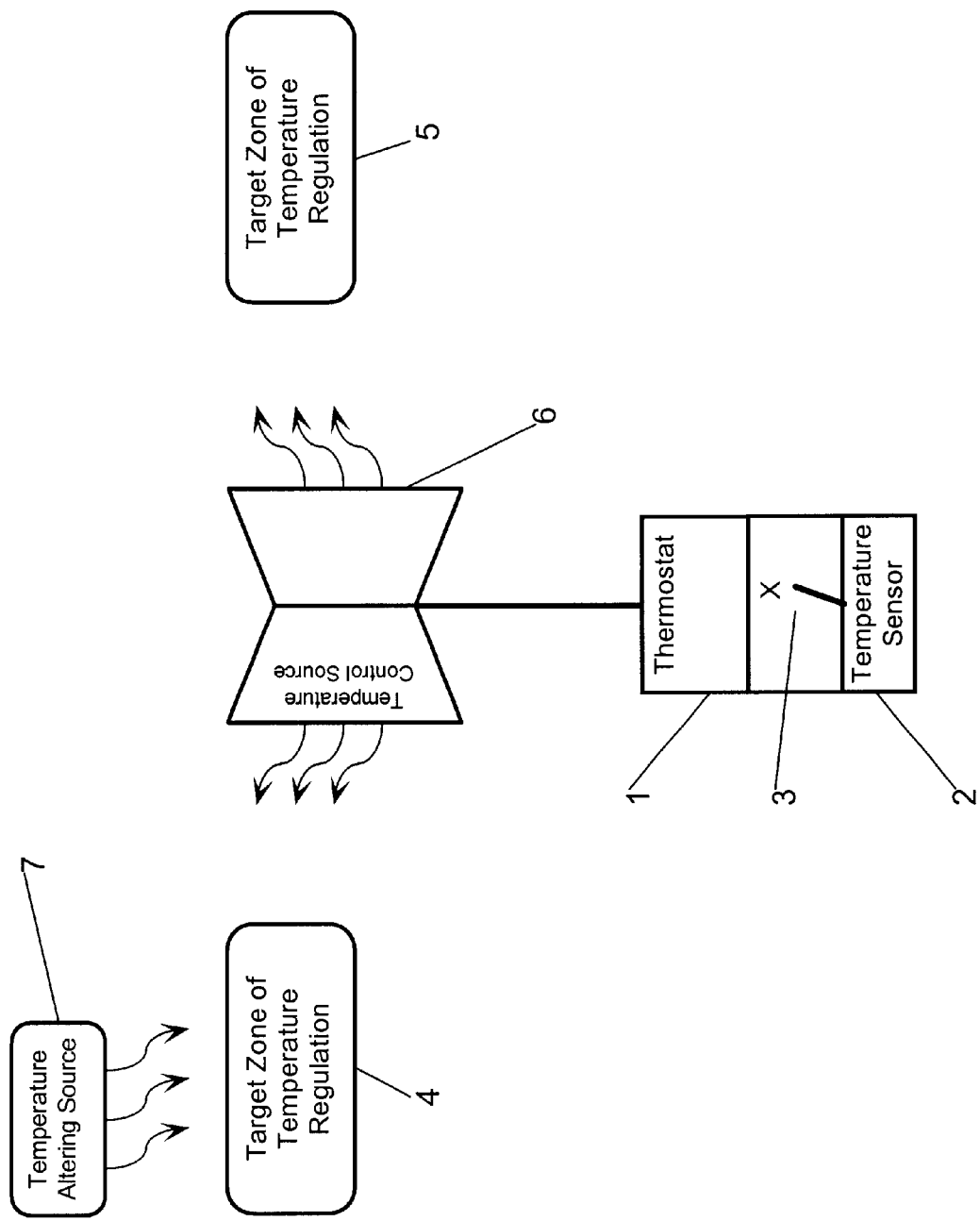
FIG. 2 is an illustration of a typical temperature control system used to regulate the temperature in two zones of temperature regulation with an additional temperature altering source in one of the zones of temperature regulation.
Figure 3:
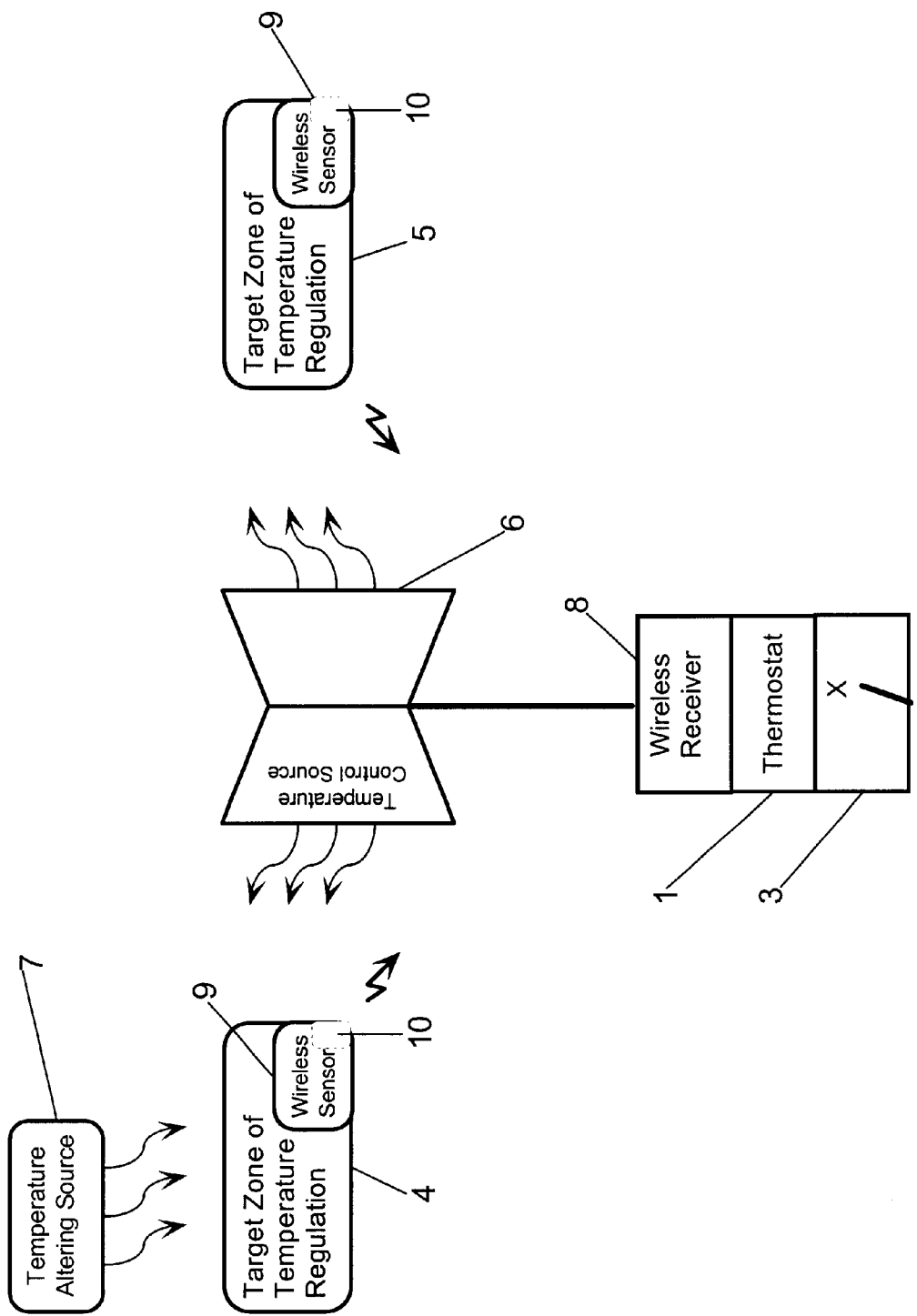
FIG. 3 is an illustration of one embodiment of the remote temperature control system being used to regulate two zones of temperature regulation with a temperature altering source affecting one zone of temperature regulation.

The embodiment of the invention shown in FIG. 3 provides a remote temperature control system with a centrally placed thermostat 1 and remotely placed temperature sensors 9 which allows the temperature to be regulated in two remote zones of temperature regulation 4 and 5 based on the temperatures in those zones. This particular embodiment of the invention contains two temperature sensors 9. These temperature sensors 9 contain wireless transmitters 10. The temperature sensors 9 measure the temperature conditions in the zone of temperature regulation 4 and 5 where they are placed. The wireless transmitters 10 then transmit the temperature conditions from the temperature sensors 9 to a wireless receiver 8, which is contained in a thermostat 1. The thermostat 1 is placed either outside of the zones of temperature regulation 4 and 5 or in a central, convenient, easily accessible area. Based on the temperature conditions received from the temperature sensors 9, the thermostat 1 sends a temperature regulation command to a temperature control source 6, such as a heating and/or air conditioning unit, telling it to turn on or off as required to regulate the temperature in the zones of temperature regulation 4 and 5 and keep them at a set temperature.

In some circumstances, a temperature altering source 7 may effect one of the zones of temperature regulation 4. This temperature altering source 7 could be a window which allows sunlight into the room, a bank of electronic instruments, or any other source that may effect the temperature in that specific zone of temperature regulation 4. The effect of this temperature altering source 7 is that the temperature conditions in one zone of temperature regulation 4 will be different from the temperature conditions in a second zone of temperature regulation 5 which is not effected by the temperature altering source 7. When this happens, there are various alternatives. If the temperature control source 6 uses air dampers to control the air flow through the duct system, or any other method where it can send different levels of heating or cooling to individual zones of temperature regulation 4 and 5, the thermostat 1 can send individual signals to the temperature control source 6 for each zone of temperature regulation 4 and 5 to regulate the temperature in each zone of temperature regulation individually to bring it to a set temperature. In addition, the thermostat 1 could take the temperature conditions received from each of the temperature sensors 9 and average them. The thermostat 1 would then base the temperature regulation command that it sends to the temperature control source 6 on the average temperature condition of the zones of temperature regulation 4 and 5.

The foregoing description of a preferred embodiment of the invention has been presented for purposes of illustration and description, and is not intended to be exhaustive or to limit the invention to the precise form disclosed. The description was selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:

1. A remote temperature control system for controlling the temperature inside a habitable zone of temperature regulation, comprising:

a thermostat located outside the habitable zone of temperature regulation;

a temperature sensor for measuring air temperature, located inside the habitable zone of temperature regulation and communicatively connected to said thermostat; and a temperature control source for controlling air temperature communicatively connected to said thermostat.

2. A remote temperature control system as recited in claim 1, wherein: the temperature sensor is communicatively connected to the thermostat via a wireless transmitter and a wireless receiver.

3. A method of regulating temperature conditions in a remote and habitable zone of temperature regulation comprising the steps of:

positioning a temperature sensor in a habitable zone of temperature regulation, said temperature sensor for measuring air temperature;

positioning a thermostat outside the habitable zone of temperature regulation;

the temperature sensor transmitting a temperature condition in the habitable zone of temperature regulation to the thermostat;

the thermostat transmitting a temperature regulation command to a temperature control source responsive to the temperature condition received from the temperature sensor, said temperature control source for controlling air temperature;

the temperature control source regulating the temperature condition in the habitable zone of temperature regulation responsive to the temperature regulation command received from the thermostat.

4. A method of regulating temperature conditions in a remote zone of temperature regulation as recited in claim 3, wherein:

the temperature sensor transmits the temperature condition in the zone of temperature regulation to the thermostat via a wireless transmitter; and the thermostat receives the temperature condition in the zone of temperature regulation from the temperature sensor via a wireless receiver.

5. A method of regulating temperature conditions in remote zones of temperature regulation as recited in claim 3, wherein:

the thermostat averages the temperature conditions received from a plurality of temperature sensors; and the thermostat transmits a temperature regulation command to the temperature control source based on the average temperature condition.

6. The method of regulating temperature conditions in remote zones of temperature regulation as recited in claim 3, wherein:

the thermostat receives the temperature conditions in a plurality of zones of temperature regulation from a corresponding plurality of temperature sensors;

the thermostat transmits an individual temperature regulation command to the temperature control source for each of the temperature conditions; and the temperature control source regulates the temperature condition of each zone of temperature regulation responsive to the individual temperature regulation command received from the thermostat.

* * * * *